US012664631B2

(12) United States Patent
Umezu et al.

(10) Patent No.: US 12,664,631 B2
(45) Date of Patent: Jun. 23, 2026

(54) IMAGE PROCESSING DEVICE, IMAGE PROCESSING METHOD, AND RECORDING MEDIUM

(71) Applicant: Socionext Inc., Kanagawa (JP)

(72) Inventors: Yuji Umezu, Yokohama (JP); Atsushi Matsuzaka, Yokohama (JP)

(73) Assignee: Socionext Inc., Kanagawa (JP)

( * ) Notice: Subject to any disclaimer, the term of this patent is extended or adjusted under 35 U.S.C. 154(b) by 289 days.

(21) Appl. No.: 18/441,675

(22) Filed: Feb. 14, 2024

(65) Prior Publication Data

US 2024/0185402 A1 Jun. 6, 2024

Related U.S. Application Data

(63) Continuation of application No. PCT/JP2021/031197, filed on Aug. 25, 2021.

(51) Int. Cl.
*G06T 5/94* (2024.01)
*G06T 5/70* (2024.01)

(52) U.S. Cl.
CPC ................. *G06T 5/94* (2024.01); *G06T 5/70* (2024.01); *G06T 2207/20192* (2013.01); *G06T 2207/30252* (2013.01)

(58) Field of Classification Search
CPC ... G06T 5/94; G06T 5/70; G06T 2207/20192; G06T 2207/30252; H04N 5/16
See application file for complete search history.

(56) References Cited

U.S. PATENT DOCUMENTS

| | | | |
|---|---|---|---|
| 10,757,339 | B2 | 8/2020 | Dabral et al. |
| 10,803,565 | B2 | 10/2020 | Chen et al. |
| 2008/0192819 | A1 | 8/2008 | Ward et al. |

(Continued)

FOREIGN PATENT DOCUMENTS

| | | | |
|---|---|---|---|
| JP | 2012108850 A | * | 6/2012 |
| JP | 2012-256168 A | | 12/2012 |

(Continued)

OTHER PUBLICATIONS

International Search Report dated Nov. 16, 2021 issued in International Patent Application No. PCT/JP2021/031197, with English translation.

(Continued)

*Primary Examiner* — Syed Haider
(74) *Attorney, Agent, or Firm* — Rimon P.C.

(57) ABSTRACT
An image processing device includes a memory and a processor configured to calculate a reference black level and a reference illumination light component based on pixel values of peripheral pixels located around a target pixel for image processing using image data acquired by an imaging device, correct a black level of the target pixels based on the reference black level calculated by the processor, and perform a tone correction of the target pixels with the black level corrected based on the reference illumination light component calculated by the processor. Accordingly, even when a large gain is applied to a dark portion of an image in a local tone correction, it is possible to generate an image with high visibility in which an occurrence of raised black levels is suppressed.

7 Claims, 13 Drawing Sheets

(56)          References Cited

U.S. PATENT DOCUMENTS

| | | | | |
|---|---|---|---|---|
| 2012/0092539 A1* | 4/2012 | Katagiri | ............... | H04N 25/573 |
| | | | | 348/E5.091 |
| 2014/0146198 A1* | 5/2014 | Omori | .................... | H04N 23/56 |
| | | | | 348/222.1 |
| 2015/0116586 A1* | 4/2015 | Mahowald | ............. | H04N 23/71 |
| | | | | 348/370 |
| 2017/0140922 A1 | 5/2017 | Iwasaki et al. | | |
| 2021/0073958 A1 | 3/2021 | Masuda | | |

FOREIGN PATENT DOCUMENTS

| | | | | |
|---|---|---|---|---|
| JP | 2015-212978 A | | 11/2015 | |
| JP | 2016-076804 A | | 5/2016 | |
| JP | 2017092350 A | | 5/2017 | |
| JP | 2017092850 A | * | 5/2017 | |
| JP | 2020-003998 A | | 1/2020 | |
| JP | 2021-016103 A | | 2/2021 | |
| WO | 2019/193807 A1 | | 10/2019 | |
| WO | 2021/010356 A1 | | 1/2021 | |

OTHER PUBLICATIONS

Written Opinion of the International Searching Authority dated Nov. 16, 2021 issued in International Patent Application No. PCT/JP2021/031197, with English translation.
Kaiming He et al., "Guided Image Filtering", IEEE Transactions on Pattern Analysis and Machine Intelligence (vol. 35, Issue: 6, Jun. 2013) pp. 1-13.
1 Office Action issued in the corresponding Japanese Patent Application No. 2023-543558, mailed on Jun. 10, 2025.

* cited by examiner

IMAGE WHEN LOCAL BLACK LEVEL CORRECTION IS NOT PERFORMED BEFORE LOCAL TONE CORRECTION

IMAGE WHEN LOCAL BLACK LEVEL CORRECTION IS PERFORMED BEFORE LOCAL TONE CORRECTION

IMAGE PROCESSING DEVICE, IMAGE PROCESSING METHOD, AND RECORDING MEDIUM

CROSS-REFERENCE TO RELATED APPLICATIONS

This U.S. non-provisional application is a continuation of PCT International Application PCT/JP2021/031197 filed on Aug. 25, 2021 and designated the U.S., the entire contents of which are incorporated herein by reference.

BACKGROUND OF THE INVENTION

1. Field of the Invention

The present disclosure relates to an image processing device, image processing method, and image processing program.

2. Background of the Invention

In recent years, an image sensor capable of capturing an HDR (High Dynamic Range) image has been developed, and it is possible to acquire an image even in a scene with a wide dynamic range, such as in a backlight condition, without any blown-out highlights. Since a dynamic range of an HDR image acquired by this kind of image sensor is wider than that of SDR (Standard Dynamic Range), the HDR image cannot be displayed on an ordinary display device. Therefore, a local tone correction (LTM: Local Tone Mapping) is performed to correct the HDR image to generate an SDR image that can be displayed on the ordinary display device. In addition, a black level correction is known as a technique for correcting image data acquired from the image sensor.

In the local tone correction, a large gain is applied to a dark portion of an image. Therefore, if the black level of the dark portion is not corrected correctly and pixel values are shifted toward higher pixel values, the black level is emphasized by the local tone correction, and an image with raised black levels is generated. In addition, the black level processing to cancel a dark current of the image sensor is uniformly performed on a whole surface of the image. Therefore, it is difficult to correct a deviation of a local black level around a strong light source, such as in backlight, by black level processing performed on the whole surface of the image. If the raised black levels or the like occur in an image due to the deviation of the local black level, visibility may be reduced and subsequent image processing may not be performed properly.

PRIOR ART LITERATURE

Patent Literature

[Patent Literature 1] Japanese Patent Publication No. 2016-76804
[Patent Literature 2] U.S. Pat. No. 10,803,565
[Patent Literature 3] U.S. Pat. No. 10,757,339
[Patent Literature 4] Japanese Patent Publication No. 2021-16103
[Patent Literature 5] International Publication No. 2019/193807
[Patent Literature 6] Japanese Patent Publication No. 2020-3998

[Patent Literature 7] Japanese Patent Publication No. 2015-212978
[Non-Patent Literature 1] Guided Image Filtering, IEEE Transactions on Pattern Analysis and Machine Intelligence (Volume: 35, Issue: 6, June 2013)

SUMMARY OF THE INVENTION

According to one embodiment of the present disclosure, an image processing device includes a memory and a processor coupled to the memory and configured to calculate, using image data acquired by an imaging device, a reference black level and a reference illumination light component based on pixel values of peripheral pixels located around a target pixel for image processing, correct a black level of the target pixel based on the reference black level calculated by the processor, and perform, based on the reference illumination light component calculated by the processor, a tone correction of the target pixel with the black level thereof corrected.

BRIEF DESCRIPTION OF THE DRAWINGS

FIG. 6 is an explanatory diagram showing an example of a method for calculating the minimum pixel value of peripheral pixels for each target pixel by the minimum value filter of FIG. 5.

FIG. 7 is a functional block diagram showing an example of the illumination light component calculation unit of FIG. 4.

DESCRIPTION OF THE PREFERRED EMBODIMENTS

In the following, embodiments will be described with reference to the accompanying drawings. Hereinafter, the image data may simply be referred to as an image.

According to one embodiment of the present disclosure, even when a large gain is applied to the dark portion of the image in the local tone correction, it is possible to generate an image with high visibility in which the occurrence of raised black levels is suppressed.

First Embodiment

Figure 1:
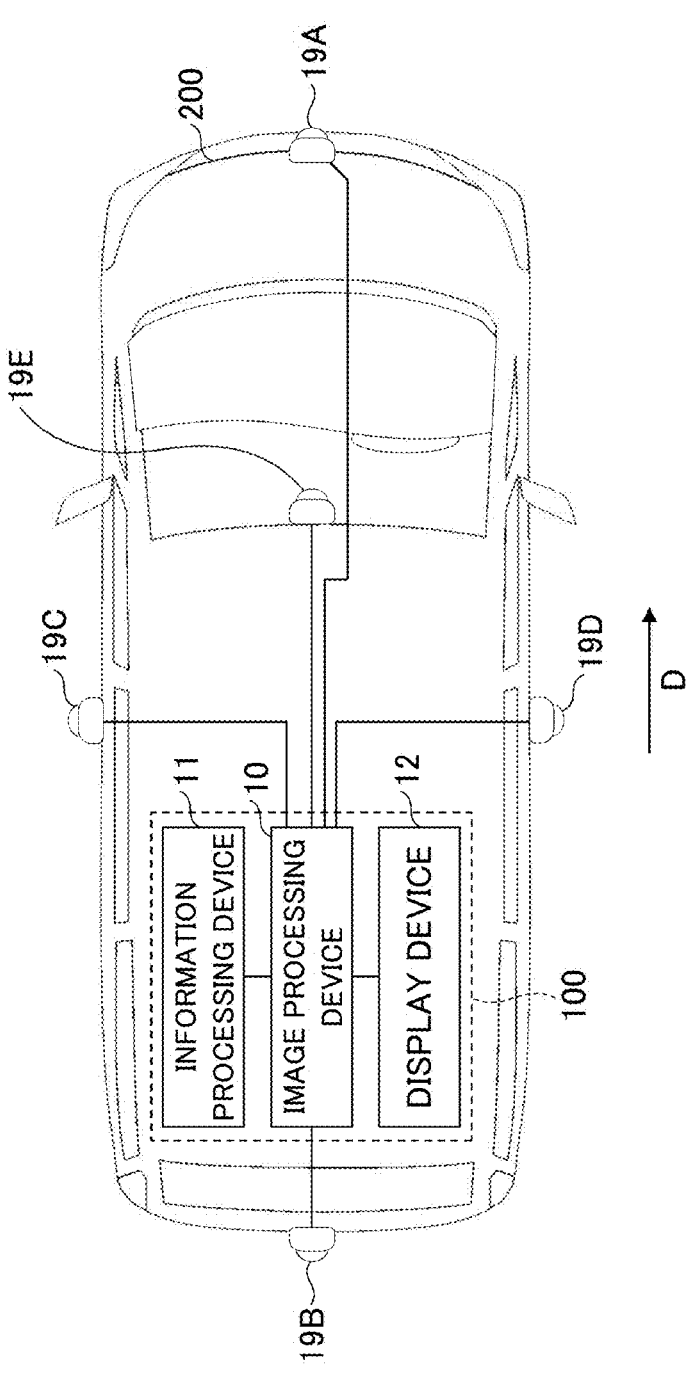
FIG. 1 is an image diagram showing an example of an image processing system including an image processing device according to a first embodiment.

FIG. 1 shows an image of an example of an image processing system including an image processing device according to the first embodiment. The image processing system 100 shown in FIG. 1 is mounted on a mobile object 200 such as an automobile, for example. Imaging devices 19A, 19B, 19C, 19D, and 19E, such as a camera, are installed on the front, rear, left, and right sides of the mobile object 200 in the traveling direction D, and in the front side of the interior of the mobile object 200. In the following, when the imaging devices 19A, 19B, 19C, 19D, and 19E are described without distinction, they are also referred to as an imaging device 19. Although not particularly limited, for example, an image sensor mounted on the imaging device 19 includes R pixels, G pixels, and B pixels for detecting red light R, green light G, and blue light B, respectively. For example, an array of R pixels, G pixels, and B pixels is a so-called Bayer array.

Note that the number and location of the imaging device 19 installed in the mobile object 200 are not limited to FIG. 1. For example, one imaging device 19 may be installed only on the front side of the mobile object 200, and two imaging devices 19 may be installed only on the front and rear sides thereof. Alternatively, the imaging device 19 may be installed on the ceiling of the mobile object 200.

In addition, the mobile object 200 on which the image processing system 100 is mounted is not limited to automobiles, and may be, for example, a drone or a transport robot operating in a factory. The image processing system 100 may also be, for example, a system for processing images acquired from an imaging device 19 other than the imaging device 19 installed in the mobile object 200, such as a surveillance camera, a digital still camera, or a digital camcorder.

Each imaging device 19 may be wired or wirelessly connected to the image processing device 10. Further, the distance between each imaging device 19 and the image processing device 10 may be longer than the distance imaged in FIG. 1. For example, the image data acquired by the imaging device 19 may be transmitted to the image processing device 10 installed outside the mobile object 200 via a network. In this case, at least one of the image processing device 10 and the information processing device 11 may be implemented by cloud computing.

The image processing system 100 includes an image processing device 10, an information processing device 11, and a display device 12. Note that in FIG. 1, the image processing system 100 is superimposed on an image diagram of the mobile object 200 viewed from above for clarity. However, in practice, the image processing device 10 and the information processing device 11 are mounted on a control board or the like mounted on the mobile object 200, and the display device 12 is installed in the mobile object 200 at a position visible to a person such as a driver. Note that the image processing device 10 may be mounted on a control board or the like as a part of the information processing device 11.

Figure 2:
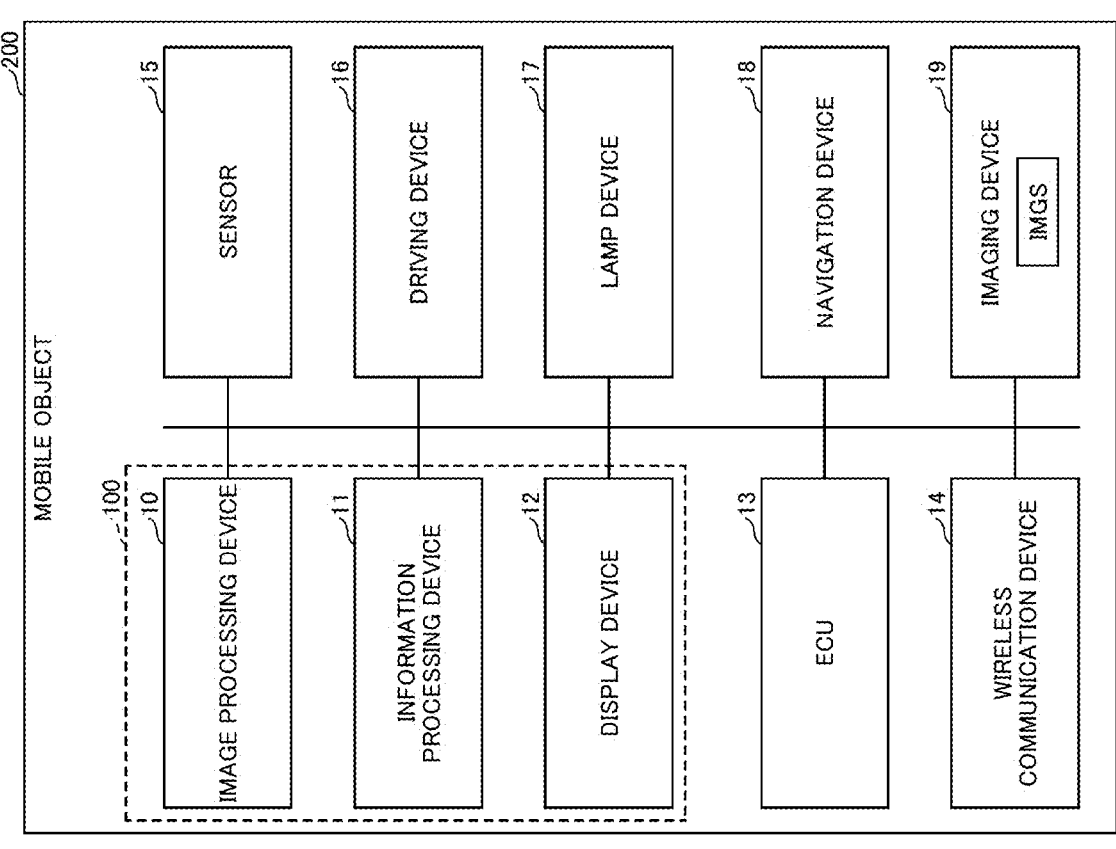
FIG. 2 is a block diagram showing an outline of the configuration of various devices mounted on the mobile object of FIG. 1.

FIG. 2 shows an outline of the configuration of various devices mounted on the mobile object 200 of FIG. 1. The mobile object 200 has an image processing device 10, an information processing device 11, a display device 12, at least one ECU (Electronic Control Unit) 13, and a wireless communication device 14, which are interconnected through an internal network. The mobile object 200 has a sensor 15, a driving device 16, a lamp device 17, a navigation device 18 and an imaging device 19. For example, the internal network is an on-board network such as a CAN (Controller Area Network) or Ethernet (registered trademark).

The image processing device 10 receives image data (frame data) acquired by the imaging device 19, and performs image processing using the received image data. The image processing device 10 may record the image data generated by the correction in an external or internal recording device.

The information processing device 11 performs processing such as image recognition using the image data processed by the image processing device 10. For example, based on the image generated by the image processing device 10, the information processing device 11 may recognize an object such as a person, a signal, or a sign outside the mobile object 200, and may track the recognized object. The information processing device 11 may function as a computer for controlling each part of the mobile object 200. The information processing device 11 may control the whole of the mobile object 200 by controlling the ECUs 13.

The display device 12 displays an image, a corrected image, and the like using the image data generated by the image processing device 10. The display device 12 may display an image of the moving body 200 in the backward direction in real time when the moving body 200 moves backward (backing up). The display device 12 may display an image output from the navigation device 18.

The ECUs 13 are provided corresponding to a mechanical unit such as an engine or a transmission, respectively. Each ECU 13 controls the corresponding mechanical unit based on an instruction from the information processing device 11. The wireless communication device 14 communicates with devices outside the mobile 200. The sensor 15 is a sensor for detecting various kinds of information. The sensor 15 may include, for example, a position sensor for acquiring current position information of the mobile object 200. The sensor 15 may also include a speed sensor for detecting the speed of the mobile object 200.

The driving device 16 is a variety of devices for moving the mobile object 200. The driving device 16 may include, for example, an engine, a steering device (steering), and a braking device (brake). The lamp device 17 is a variety of lighting fixtures mounted on the moving body 200. The lamp device 17 may include, for example, a headlight (headlamp), a lamp of a direction indicator (turn signal), a backlight and a brake lamp, and the like. The navigation device 18 is a device for audio and display guidance of a route to a destination.

The imaging device 19 has, for example, an image sensor IMGS having a Bayer array in which R pixels, G pixels, and B pixels including a plurality of filters that transmit red light R, green light G, and blue light B, respectively, are mounted. That is, the image sensor IMGS includes a plurality of pixels that differ in the wavelength region of the light to be detected. As described above, the image data acquired by the imaging device 19 is processed by the image processing device 10.

Figure 3:
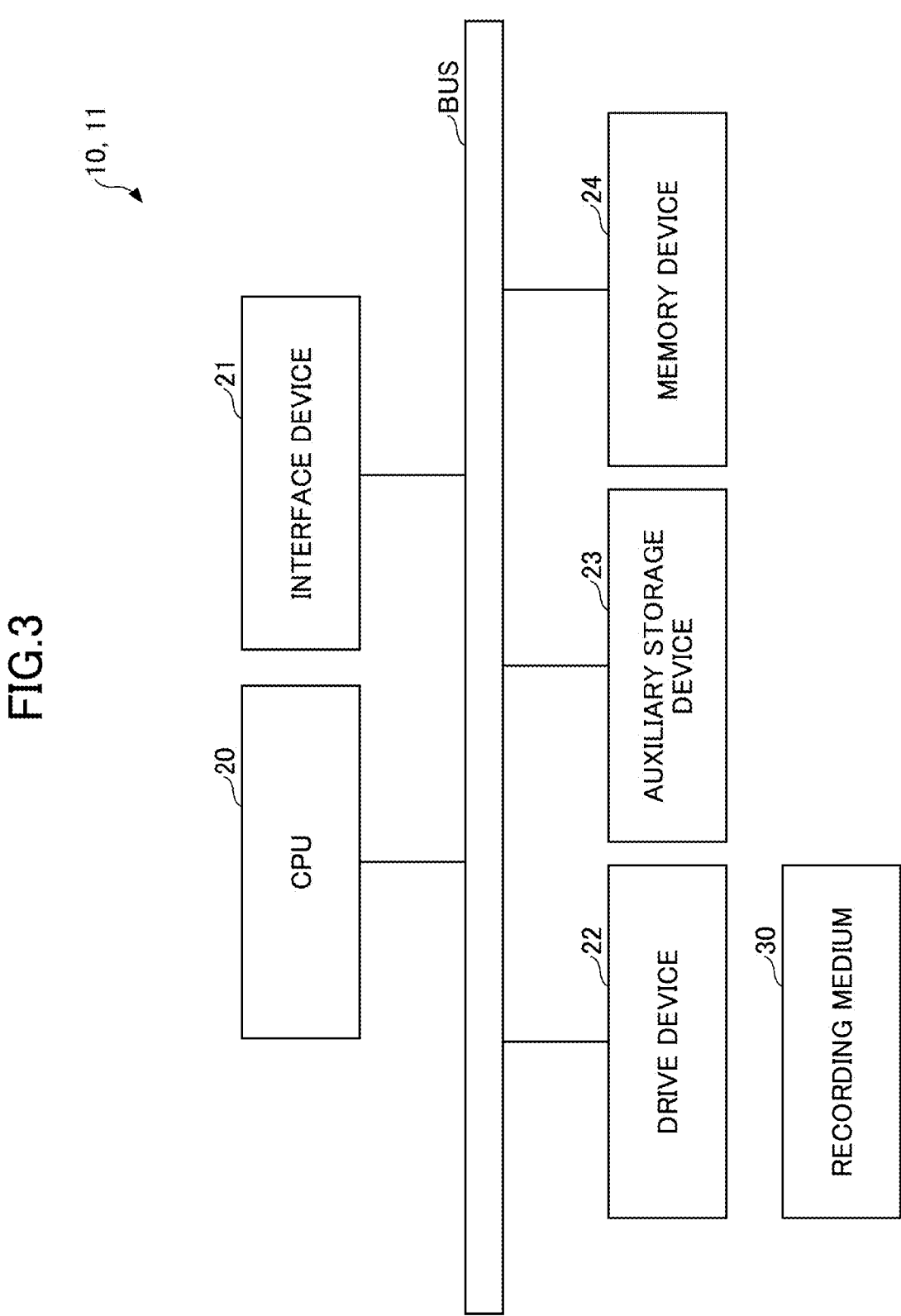
FIG. 3 is a block diagram showing an example of the configuration of the image processing device and the information processing device of FIG. 2.

FIG. 3 shows an example of the configurations of the image processing device 10 and the information processing device 11 of FIG. 2. Since the configurations of the image processing device 10 and the information processing device 11 are similar to each other, the configuration of the image processing device 10 will be described below. For example, the image processing device 10 includes a CPU 20, an interface device 21, a drive device 22, an auxiliary storage device 23, and a memory device 24, which are interconnected by a bus BUS.

The CPU 20 executes an image processing program stored in the memory device 24 to perform various image processing described later. The interface device 21 is used to connect to a network (not shown).

The drive device 22 has an interface for connecting the recording medium 30 and, for example, transfers an image processing program stored in the recording medium 30 to the auxiliary storage device 23 based on an instruction from the CPU 20. Note that the drive device 22 may transfer image data or the like stored in the auxiliary storage device 23 to the recording medium 30.

The auxiliary storage device 23 is, for example, an HDD (Hard Disk Drive) or an SSD (Solid State Drive) or the like, and holds an image processing program, image data, various parameters used for image processing, and the like. The memory device 24 is, for example, a DRAM (Dynamic Random Access Memory), and holds an image processing program or the like transferred from the auxiliary storage device 23.

Figure 4:
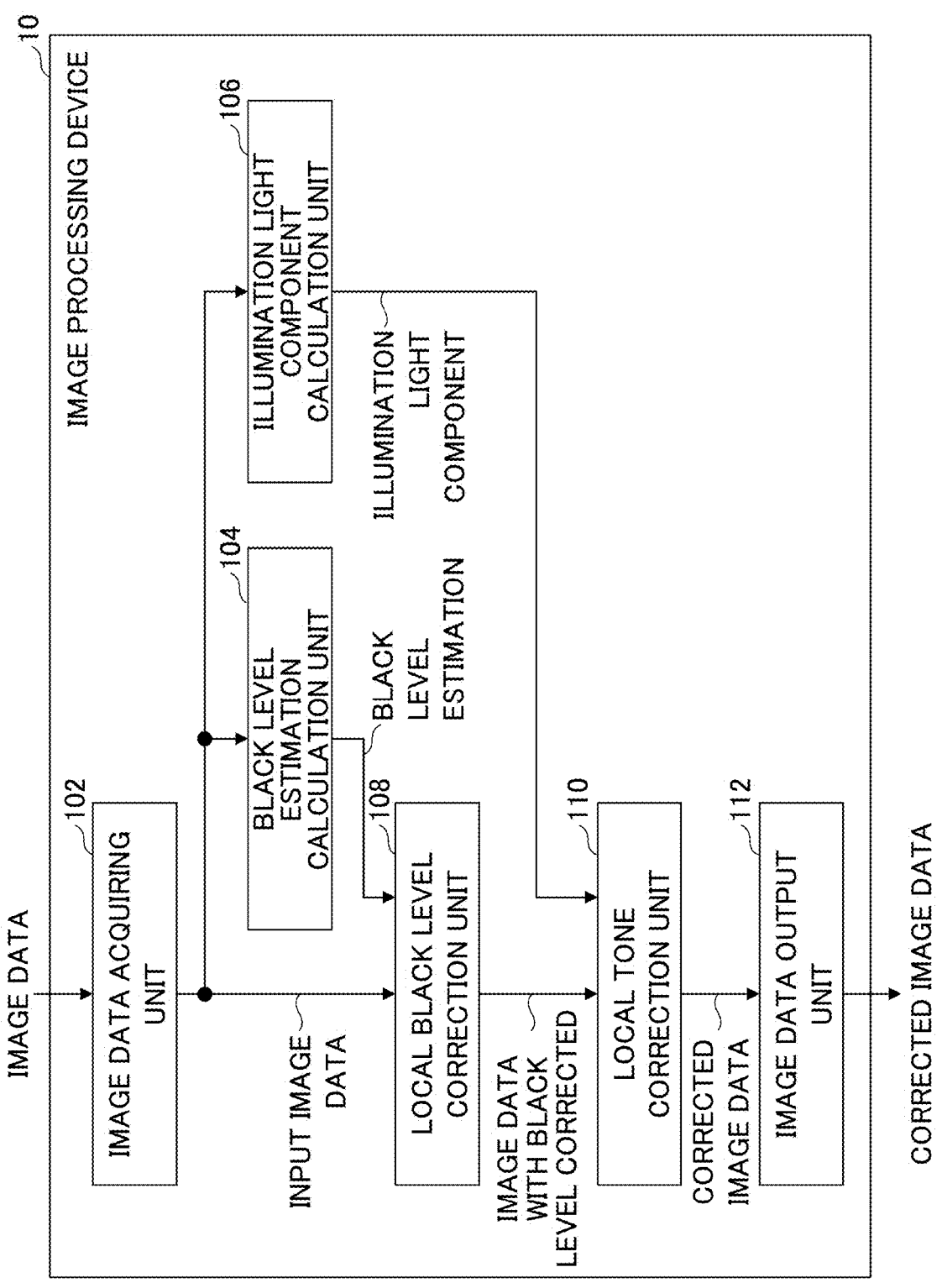
FIG. 4 is a functional block diagram showing an example of the configuration of the image processing device of FIG. 1.

FIG. 4 shows an example of the configuration of the image processing device 10 of FIG. 1. The image processing device 10 includes an image data acquiring unit 102, a black level estimation calculation unit 104, an illumination light component calculation unit 106, a local black level correction unit 108, a local tone correction unit 110, and an image data output unit 112. The black level estimation calculation unit 104 and the illumination light component calculation unit 106 are examples of calculation units.

The image data acquiring unit 102 acquires image data indicating an image around the mobile object 200 captured by at least one of the imaging devices 19. For example, the image data acquired by the image data acquiring unit 102 is frame image data constituting a moving image captured by the imaging device 19. Note that the image data acquiring unit 102 may acquire image data from a storage device in which image data captured by the imaging device 19 or the like is stored.

The black level estimation calculation unit 104 receives image data acquired by the image data acquiring unit 102 as input image data. The black level estimation calculation unit 104 calculates, as the black level estimation of the target pixel, a minimum value of the pixel values of the peripheral region located around the target pixel of image processing in the image indicated by the input image data.

By using the minimum value of the pixel values of the peripheral pixels as the black level estimation, the black level estimation calculation unit 104 can calculate an appropriate black level estimation even when the black level of the target pixel is high due to the influence of the surrounding light source, for example. Thus, the local black level correction unit 108 described later can appropriately correct the black level of the target pixel. The black level estimation of the target pixel calculated by the black level estimation calculation unit 104 is an example of the reference black level.

The illumination light component calculation unit 106 calculates, as the illumination light component of the target pixel, the average value of the pixel values of the peripheral pixels located in the peripheral region of the target pixel. By using the average value of the pixel values of the peripheral pixels as the illumination light component, the illumination light component calculation unit 106 can calculate an appropriate illumination light component even when the pixel value of the target pixel changes due to the influence of the surrounding light source, for example. Thus, the local tone correction unit 110 described later can appropriately perform the tone correction of the target pixel. The illumination light component of the target pixel calculated by the illumination light component calculation unit 106 is an example of the reference illumination light component.

The local black level correction unit 108 receives a black level estimation from the black level estimation calculation unit 104 for each target pixel, that is, a pixel in the image indicated by the input image data. Then, the local black level correction unit 108 performs local black level correction (LBC) for each target pixel based on the black level estimation, and generates image data with the black level corrected.

The local tone correction unit 110 performs local tone correction (LTM: Local Tone Mapping) of image data with the black level corrected by the local black level correction unit 108, based on the illumination light component from the illumination light component calculation unit 106, and generates corrected image data. The image data output unit 112 outputs the corrected image data output from the local tone correction unit 110 to, for example, a display device 12.

Normally, the correction unit that performs local tone correction reduces the dynamic range by changing the tone correction method for each local region of the image, and generates image data that can be displayed by the display device 12 or the like. For example, the correction unit applies a large gain to the dark portion to brighten the image, and applies a small gain to the bright portion to correct the image so that it does not become too bright, thereby making the brightness of the entire image uniform. Thus, loss of image information due to local tone correction that narrows the dynamic range of the image is suppressed.

However, for example, if the black level of the dark portion deviates to the bright side, the pixel values may be excessively increased when a large gain is applied to the dark portion by the local tone correction. Thus, when an image with such a white defect is generated, the visibility of the image is reduced. For example, a deviation in the black level of a dark portion may be caused by the influence of light scattering around a strong light source.

The local black level correction unit 108 of the present embodiment performs a local black level correction for correcting locally appearing raised black levels of pixel values occurring due to an optical effect such as halation caused by imaged objects, rather than the black level correction of the entire image for cancelling the dark current of the image sensor IMGS. Note that the correction for a raise in black levels caused by the dark current of the image sensor IMGS may be performed by a correction unit other than the local black level correction unit 108. In this case, the correction performed by the other correction unit is preferably performed before the black level correction performed by the local black level correction unit 108.

The image processing device 10 corrects the black level by the local black level correction unit 108 before performing the tone correction of the image by the local tone correction unit 110. Thus, even in the case where a white defect or the like occurs in an image in a region adjacent to a strong light source, the local black level correction unit 108 can generate image data in which the white defect or the like is suppressed by the local black level correction, and supply the image data to the local tone correction unit 110. As a result, the image processing device 10 can suppress an excessive increase in pixel values by the local tone correction unit 110. That is, the deterioration of image visibility can be suppressed by the tone correction performed by the local tone correction unit 110.

Figure 5:
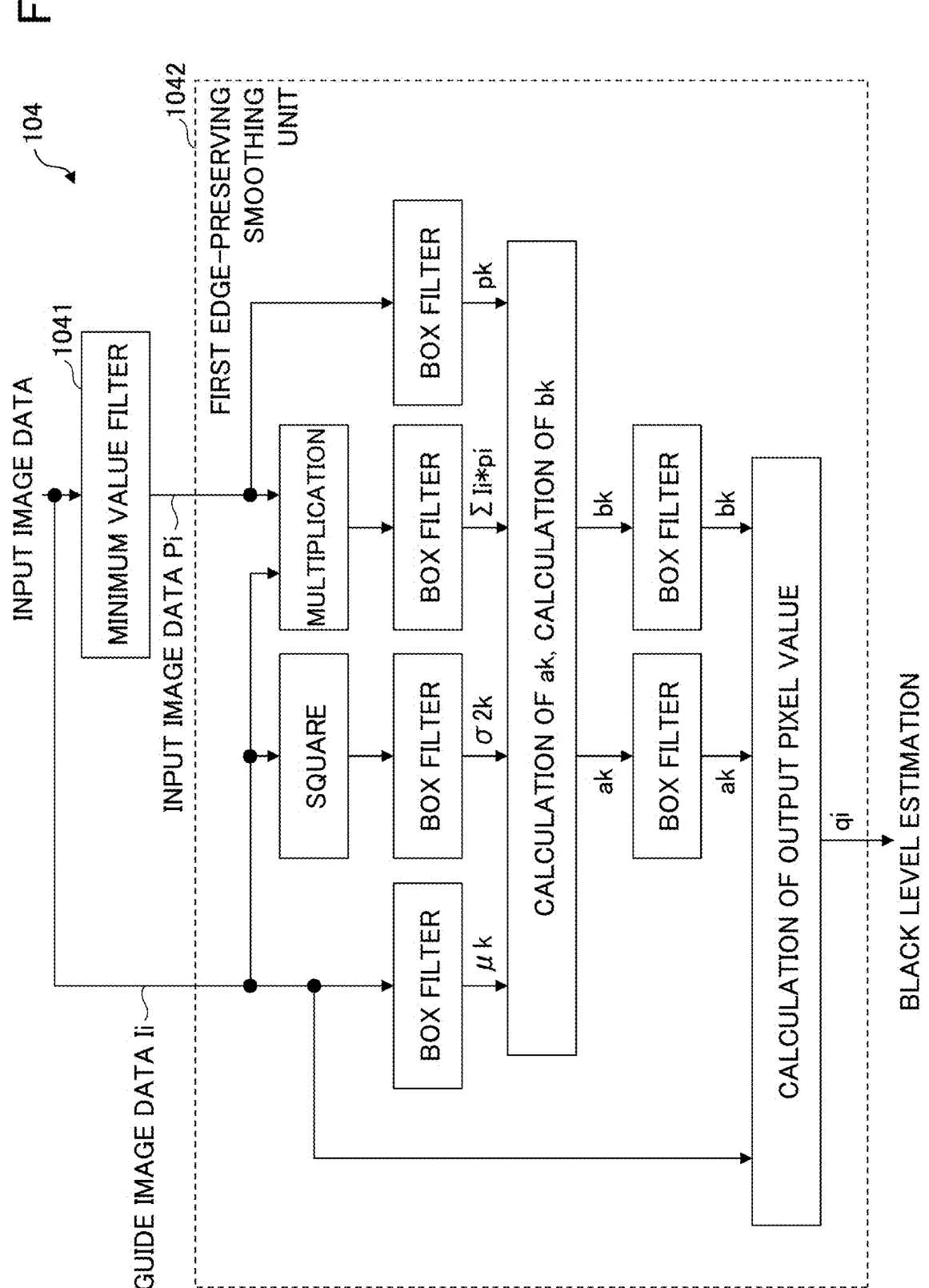
FIG. 5 is a functional block diagram showing an example of the black level estimation calculation unit of FIG. 4.

FIG. 5 shows an example of the function of the black level estimation calculation unit 104 of FIG. 4. The black level estimation calculation unit 104 includes a minimum value filter 1041 and a first edge-preserving smoothing unit 1042.

The minimum value filter 1041 sequentially sets each pixel in the image indicated by the input image data as a target pixel, and obtains the minimum value of the pixel values of the peripheral pixels in the peripheral region of the target pixel for each target pixel. Then, the minimum value filter 1041 assigns each of the obtained minimum pixel values to the position of the corresponding target pixel, thereby generating the input image data Pi (minimum value image data).

The first edge-preserving smoothing unit 1042 can use a guided filter or the like that performs an edge-preserving smoothing process based on the input image data Pi and the guide image data Ii. The first edge-preserving smoothing unit 1042 performs square processing (i.e., a squaring calculation), multiplication processing, calculation of an average value by a plurality of box filters, calculation of a coefficient ak, calculation of a coefficient bk, and calculation of an output pixel value, to obtain a black level estimation. In the following, the input image data Pi and the guide image data Ii are also referred to as the input image Pi and the guide image Ii.

The box filter calculates an average value of the pixel values of the peripheral pixels. Although not particularly limited, for example, the peripheral pixels include N vertical pixels and N horizontal pixels including the target pixel, and "N" is, for example, "32". The sign μk indicates the average value of the pixel values of the peripheral pixels located around the target pixel of the guide image Ii. The sign σ2k indicates the average value of the squares of the pixel values of the peripheral pixels of the guide image Ii. The sign Σli*pi (sign * indicates multiplication) indicates the average value obtained by multiplying the pixel values of the peripheral pixels of the input image Pi and the pixel values of the peripheral pixels of the guide image Ii, respectively. The sign pk indicates the average value of the pixel values of the peripheral pixels of the input image Pi. The signs ak and bk indicate the coefficients to be applied to the guide image Ii.

The coefficient ak is given by Eq. (1) and the coefficient bk is given by Eq. (2). The sign qi representing the black level estimation is given by Eq. (3).

$$a_k = \frac{\frac{1}{|\omega|}\sum_{i\in\omega_k} I_i p_i - \mu_k \overline{p}_k}{a_k^2 + \epsilon} \tag{1}$$

$$b_k = \overline{p}_k - a_k \mu_k \tag{2}$$

$$q_i = a_k I_i + b_k \tag{3}$$

The edges of the image or the like are not taken into account in the minimum value of the pixels obtained by the processing performed by the minimum value filter 1041. In this embodiment, by smoothing the input image data Pi of the minimum pixel value output from the minimum value filter 1041 according to the guide image by the first edge-preserving smoothing unit 1042, the accuracy of the minimum value at the boundary portions of different regions of the light source can be improved. For example, the accuracy of the minimum value at the edge portions of the image, such as the boundaries between the inside and outside of a tunnel, can be improved. As a result, the black level estimation calculation unit 104 can calculate the black level estimation for reducing the effect of flare, halation, etc. for each target pixel in the entire image. Note that the edge-preserving smoothing process may be performed using a joint bilateral filter or the like.

Figure 6:
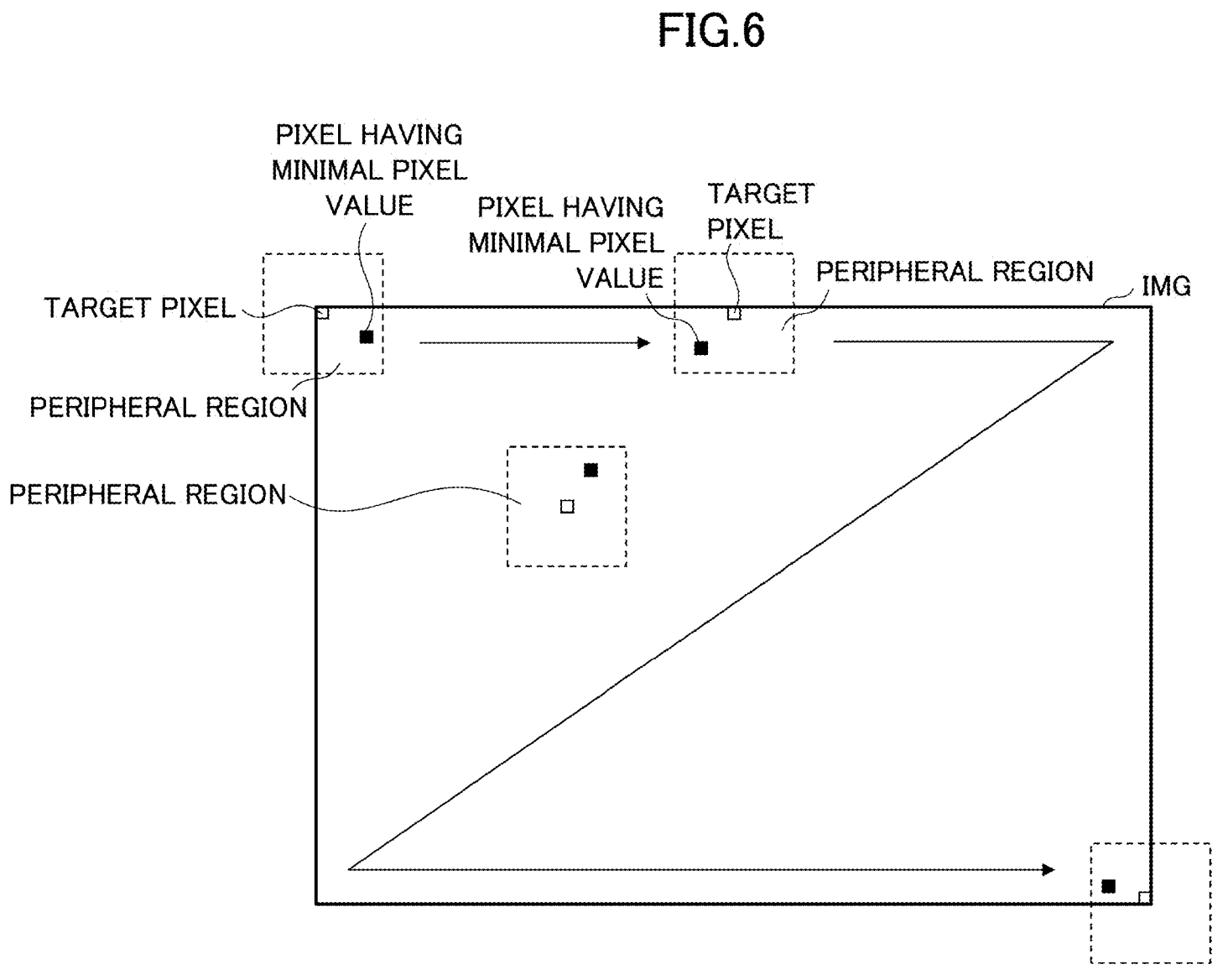

FIG. 6 shows an example of a method for calculating the minimum pixel value of peripheral pixels for each target pixel by the minimum value filter 1041 of FIG. 5. In FIG. 6, the target pixel is indicated by a white rectangle, and the minimum pixel value of peripheral pixels is indicated by a black rectangle. For example, the minimum value filter 1041 shifts the target pixel and the peripheral region of the target pixel by one pixel by raster scanning or the like in the image IMG indicated by the input image data, and obtains the minimum pixel value in each peripheral region.

The peripheral region, the minimum pixel value of which is to be obtained, includes a predetermined number of pixels around the target pixel. For example, the number of pixels around the target pixel is N2 including the target pixel. Here, N is an arbitrary natural number. However, in a region close to each of the four corners and each side of the image IMG, the number of pixels for obtaining the minimum pixel value is smaller than N2. Note that in the box filter of FIG. 5, the target pixel and the peripheral region of the target pixel are shifted by one pixel as well, and the average value of the pixel values in each peripheral region is obtained. As shown in FIG. 6, the image processing device 10 can obtain the minimum pixel value and the average pixel value for each peripheral pixel located around the target pixel by raster scanning the target pixel. Note that the number of pixels in the peripheral region for obtaining the minimum pixel value is not limited to N2, but may be A vertically and B horizontally (A and B are natural numbers of different values).

Figure 7:
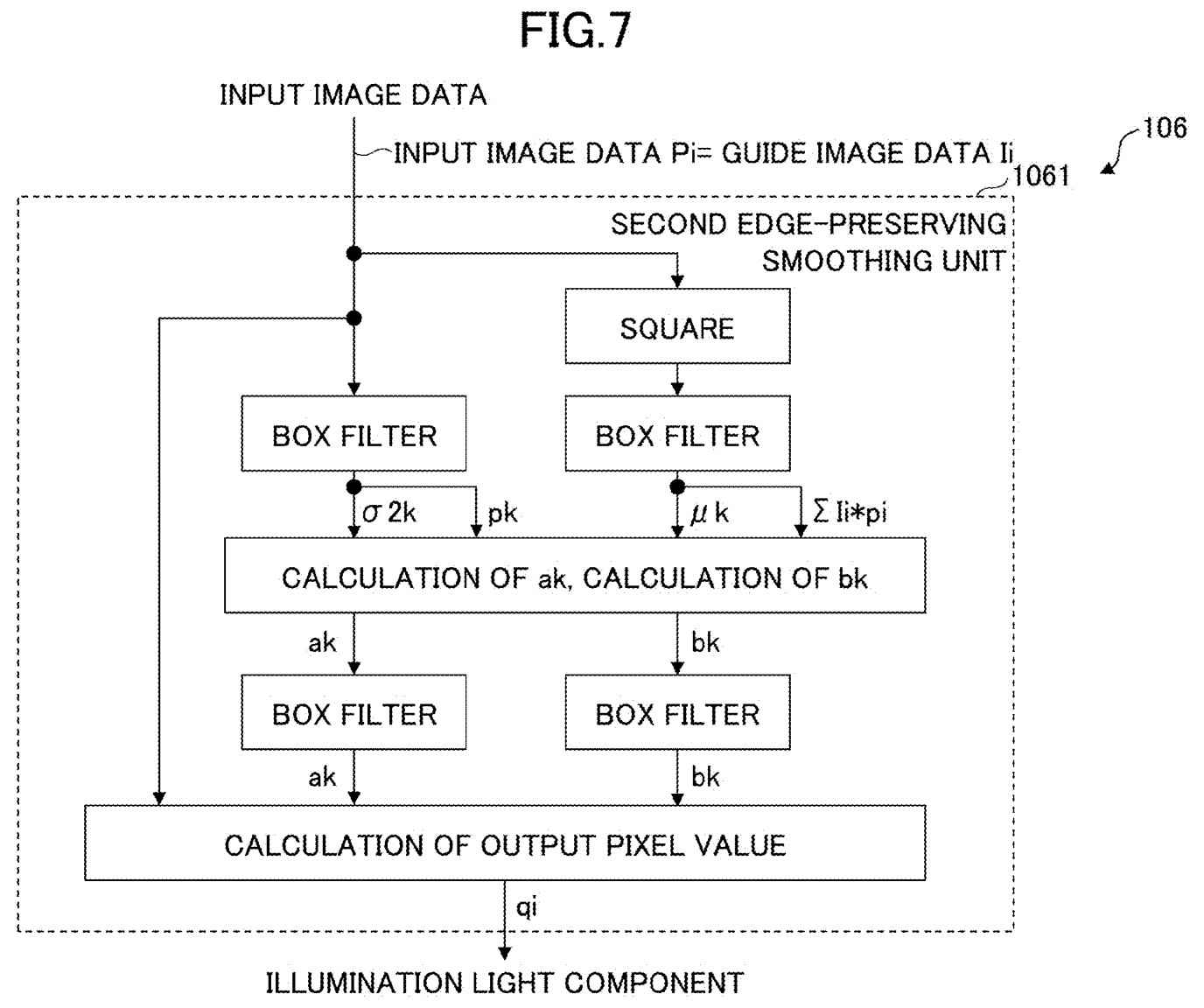

FIG. 7 shows an example of the function of the illumination light component calculation unit 106 of FIG. 4. The illumination light component calculation unit 106 has a second edge-preserving smoothing unit 1061. For example, the second edge-preserving smoothing unit 1061 performs an edge-preserving smoothing process based on the input image Pi and the guide image Ii by using a guided filter or the like, and calculates the illumination light component.

Note that when determining the illumination light component, the input image Pi and the guide image Ii are the same as each other. The second edge-preserving smoothing unit 1061 performs square processing, calculation of an average value by a plurality of box filters, calculation of coefficients ak and bk, and calculation of an output pixel value, to determine the illumination light component. The illumination light component can be estimated by the average of the pixel values of the image, but similarly to the black level estimation, the accuracy of the average value may be low at the boundary portion of different regions of the light source. Therefore, by performing the smoothing process of the input image data by the second edge-preserving smoothing unit 1061, the decrease in the accuracy of the average value at the boundary portion of the illumination light component can be suppressed.

By using the first edge-preserving smoothing unit 1042 and the second edge-preserving smoothing unit 1061 separately, the image processing unit 10 can calculate an appropriate black level estimation and an appropriate illumination light component, respectively.

Figure 8:
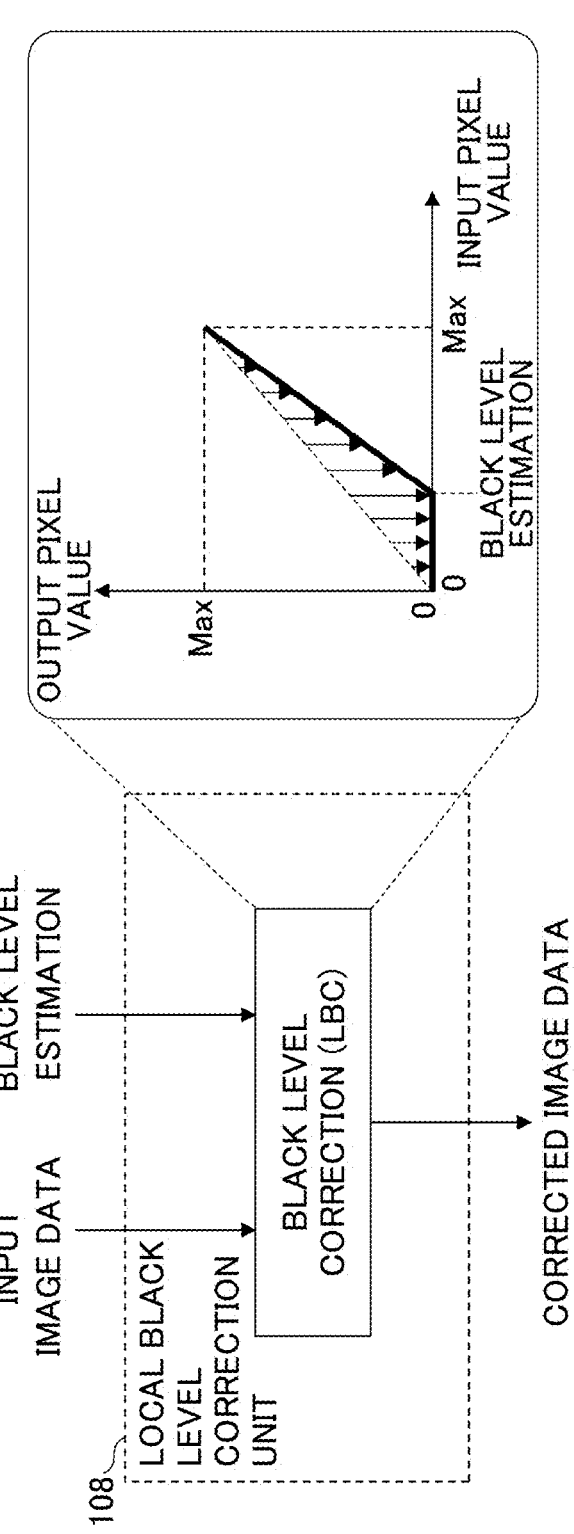
FIG. 8 is a functional block diagram showing an example of the local black level correction unit of FIG. 4.

FIG. 8 shows an example of the function of the local black level correction unit 108 shown in FIG. 4. The local black level correction unit 108 corrects the black level of the input image data using the black level estimation calculated by the black level estimation calculation unit 104, and outputs the corrected image data. For example, the local black level correction unit 108 sets a pixel value equal to or less than the black level estimation to "0" in the local black level correction (LBC).

That is, the local black level correction unit 108 estimates that the pixel value equal to or less than the black level estimation is a false pixel value due to, for example, the raised black levels or the like caused by the influence of a light source having high luminance. The local black level correction unit 108 then corrects the false pixel value to the correct pixel value when no raised black levels or the like occur. Therefore, the subsequent processing by the local tone correction unit 110 can prevent the pixel value of the subject located near the light source having high luminance in the image from increasing (i.e., the occurrence of raised black levels).

For example, the local black level correction unit 108 may perform the correction of the black level using Eq. (4).

$$Y=(X-K)*\text{Max}/(\text{Max}-K) \qquad (4)$$

In Eq. (4), the sign X indicates the input pixel value, the sign K indicates the black level estimation, the sign Max indicates the maximum value of the input pixel values and of the output pixel values, and the sign Y indicates the output pixel value. Note that the local black level correction unit 108 may correct the image data using a lookup table that holds various values of the parameters in Eq. (4).

Figure 9:
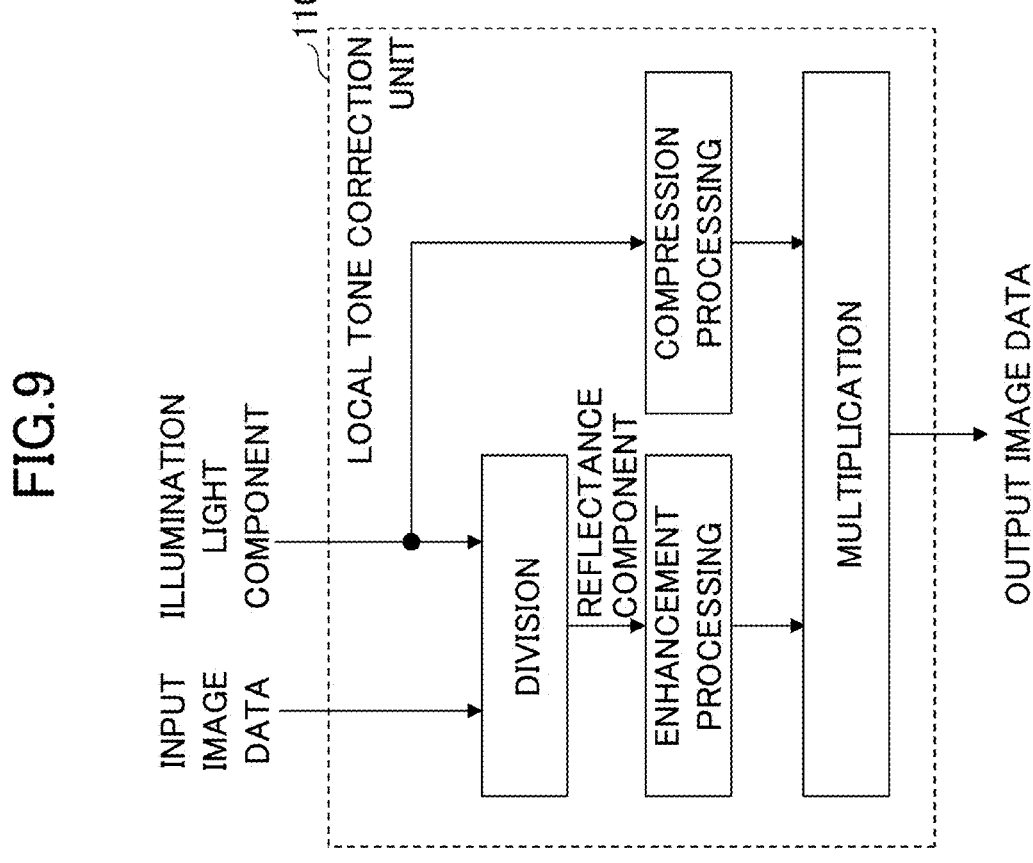
FIG. 9 is a functional block diagram showing an example of the function of the local tone correction unit of FIG. 4.

FIG. 9 shows an example of the function of the local tone correction unit 110 of FIG. 4. Using a technique known as Retinex theory, the local tone correction unit 110 performs division, enhancement processing, compression processing, and multiplication, and outputs locally tone-corrected output image data.

By dividing the input image data and the illumination light component, the local tone correction unit 110 calculates the reflectance component, which is a signal representing the texture component of the object. The local tone correction unit 110 performs an enhancement processing on the reflectance component calculated by the division, so that the texture component can be easily seen.

The local tone correction unit 110 performs compression processing on the illumination light component to convert the image data into image data with little change in illumination. As the illumination light component to be compressed, the data calculated by the illumination light component calculation unit 106 of FIG. 4 is used. The local tone correction unit 110 multiplies the reflectance component subjected to the enhancement processing and the illumination light component subjected to the compression processing, to generate output image data subjected to local tone correction.

Thus, the local tone correction unit 110 can generate image data (images that are easy to see clearly) with less black defects and raised black levels even when the number of bits is small and the dynamic range is narrow. Note that the local tone correction unit 110 may perform tone correction that changes the shape of the tone for each local region without using the Retinex theory. Also, in this case, the local tone correction unit 110 can generate output image data that has been subjected to the local tone correction in the same manner as the output image data generated using the Retinex theory.

Furthermore, since the enhancement processing, compression processing, and the like performed in the local tone correction are performed using the illumination light component, the additional calculation process can be dispensed with, and the increase in the processing load of the image processing device 10 can be suppressed.

Figure 10:
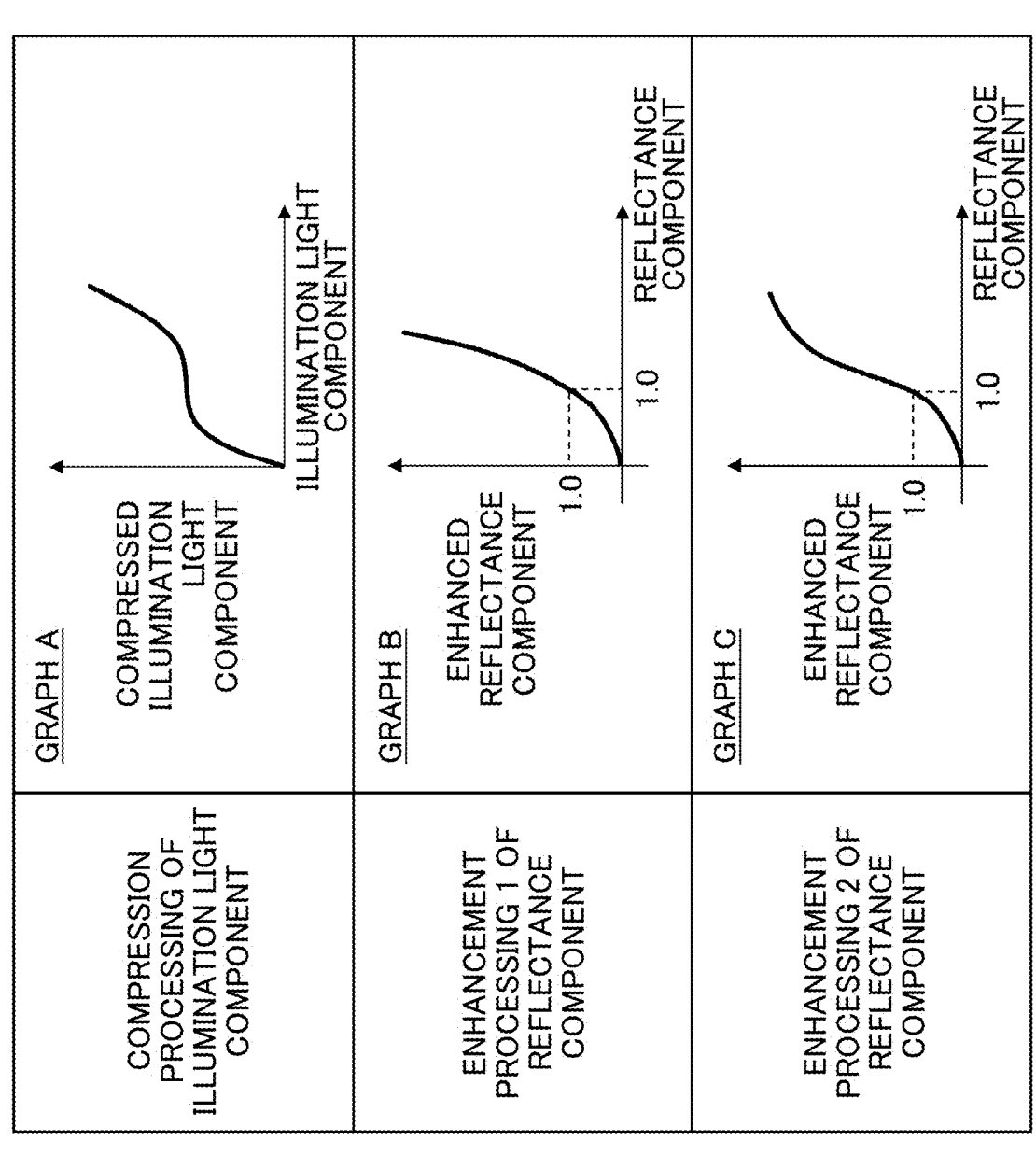
FIG. 10 is an explanatory diagram showing an example of the compression processing of the illumination light component and the enhancement processing of the reflectance component of FIG. 9.

FIG. 10 shows an example of the compression processing of the illumination light component and the enhancement processing of the reflectance component of FIG. 9.

For example, in the compression processing of the illumination light component, the local tone correction unit 110 corrects the dark portion of the illumination light component brightly, and corrects the light part of the illumination light component darkly, using the tone curve shown in the graph A. Thus, in the local tone correction, the brightness of the entire image can be made uniform.

In addition, in the enhancement processing (1) of the reflectance component, the local tone correction unit 110 performs an enhancement processing such as a multiplication processing on the logarithm of the reflectance component, as shown in the graph B, so that the texture of the image can be corrected to be more visible. For example, the graph B is shown by the Eq. (5).

$$\text{Enhanced reflectance component}=\exp(\ln(\text{reflectance component})*\text{gain}) \qquad (5)$$

Furthermore, the local tone correction unit 110 may perform the enhancement processing (2) of the reflectance component instead of the enhancement processing (1) of the reflectance component. For example, in the enhancement processing (2) of the reflectance component, the enhancement processing shown in the graph C is performed instead of the graph B.

Figure 11:
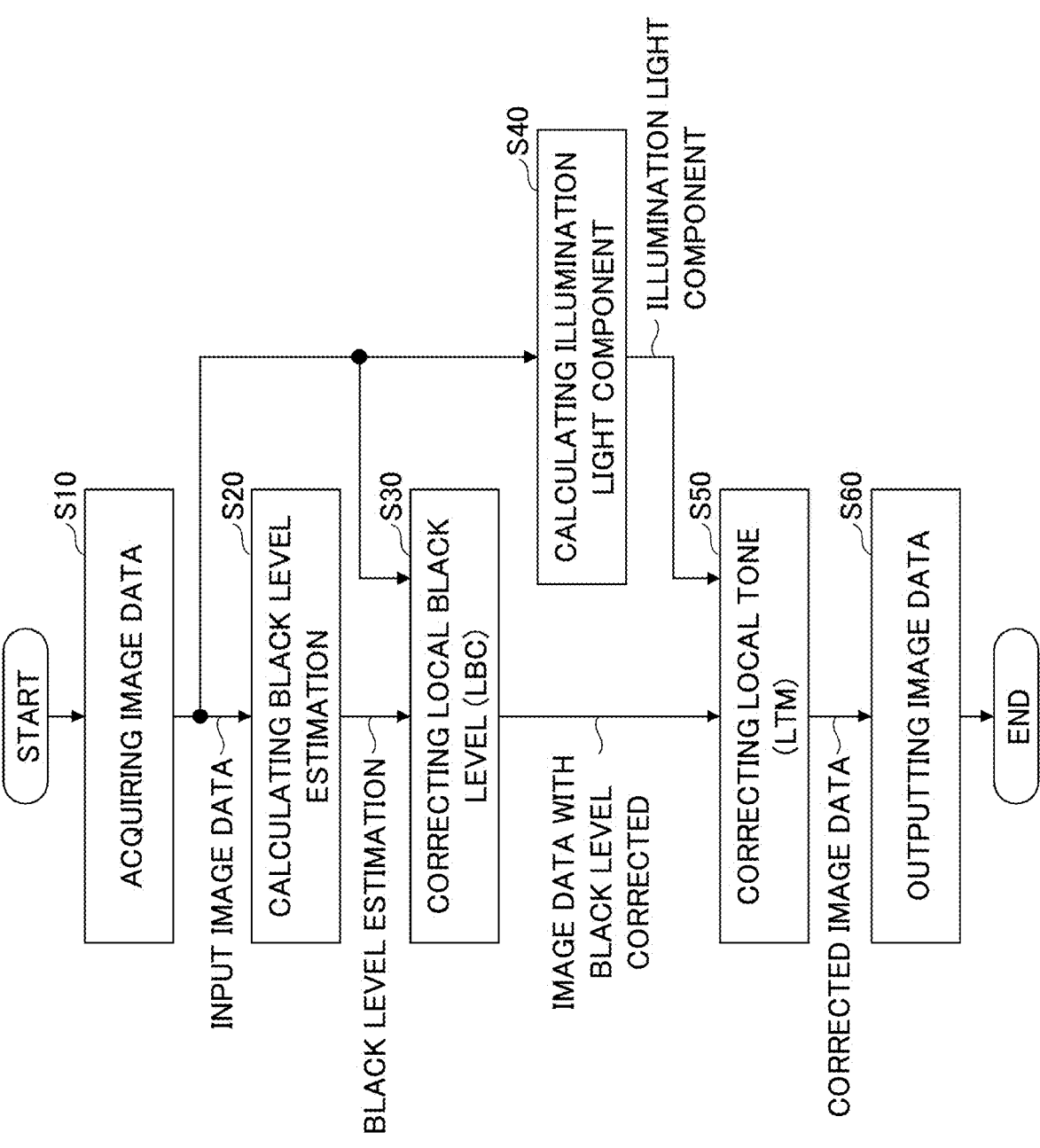
FIG. 11 is a flowchart showing an example of the processing to reduce the dynamic range of image data performed by the image processing device of FIG. 1.

FIG. 11 shows an example of a processing flow for reducing the dynamic range of image data performed by the image processing device 10 of FIG. 1. That is, FIG. 11 shows an example of an image processing method by the image processing device 10. The flow shown in FIG. 11 may be implemented, for example, by the CPU 20 (FIG. 3) of the image processing device 10 executing an image processing program.

Note that the flow shown in FIG. 11 may be implemented by hardware such as an FPGA or an ASIC mounted on the image processing device 10. Alternatively, the flow shown in FIG. 11 may be implemented by cooperating hardware and software.

First, in step S10, the image data acquiring unit 102 of FIG. 4 acquires image data from, for example, the imaging device 19 or the like, and outputs it as input image data used for image processing. Next, in step S20, the black level estimation calculation unit 104 of FIG. 4 calculates the black level estimation by obtaining the minimum value of pixel values of peripheral pixels for each target pixel in the input image data.

Next, in step S30, the local black level correction unit 108 of FIG. 4 performs local black level correction (LBC) on the input image data based on the black level estimation, to generate image data with the black level corrected. In step S40, the illumination light component calculation unit 106 of FIG. 4 calculates the average value of the pixel values of the peripheral pixels as the illumination light component for each target pixel in the input image data. Note that step S40 may be performed between step S10 and step S50.

After steps S30 and S40 are performed, in step S50, the local tone correction unit 110 of FIG. 4 performs local tone correction (LTM) of the image data with the black level corrected based on the illumination light component, to generate the corrected image data. Next, in step S60, the image data output unit 112 of FIG. 4 outputs the corrected image data with the local tone corrected to, for example, the display device 12, and terminates the processing shown in FIG. 11.

Figure 12:
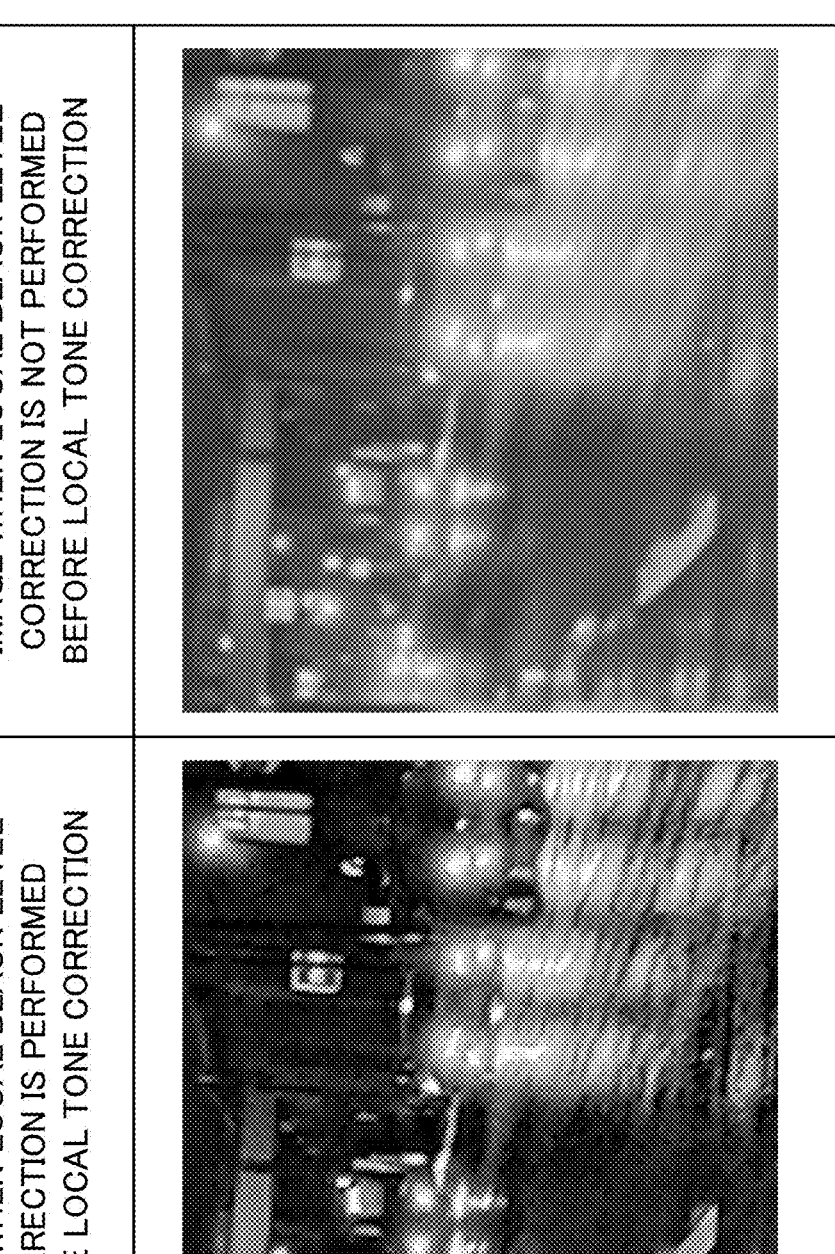
FIG. 12 is an explanatory diagram showing an example of an image when a local black level correction is performed before the local tone correction, and an example of an image when the local black level correction is not performed before the local tone correction.

FIG. 12 shows an example of an image when the local black level correction is performed before the local tone correction, and an example of an image when the local black level correction is not performed before the local tone correction.

As described above, when the local black level correction is performed before the local tone correction, it is possible to obtain an image with less raised black levels, higher contrast, and higher visibility. Thus, for example, image processing using the corrected image data can be appropriately performed.

On the other hand, if the local black level correction is not performed before the local tone correction, raised black levels may occur in the dark portion of the image, and the entire image may become hazy. In addition, the visibility of the image deteriorates due to the influence of the light scattering around a strong light source. Therefore, the image processing using the corrected image data may not be performed properly.

As described above, in this embodiment, the image processing device 10 performs the local black level correction before performing the local tone correction on the image data acquired from the imaging device 19 or the like. Thus, for example, in the case where a strong light source is reflected in the image, the raised black levels of the image due to the local tone correction can be suppressed. That is, even when a large gain is applied to the dark portion of the image in the local tone correction, it is possible to generate an image with high visibility in which the occurrence of raised black levels is suppressed.

By smoothing the input image data Pi of the minimum pixel values output from the minimum value filter 1041 according to the guide image by the first edge-preserving smoothing unit 1042, it is possible to suppress the deterioration of the accuracy of the minimum values at the boundary portions. As a result, the black level estimation calculation unit 104 can calculate the black level estimation for reducing the effect of flare, halation, etc. for each target pixel in the entire image.

By performing the smoothing process of the input image data by the second edge-preserving smoothing unit 1061, it is possible to suppress the decrease in the accuracy of the average value at the boundary portions of the illumination light component.

Furthermore, it is possible to reduce the flare and halation generated by the influence of the lens of the imaging device 19. In addition, by performing the black level correction before the local tone correction, it is possible to reproduce the optically correct color in comparison with the case where only the local tone correction is performed.

Second Embodiment

Figure 13:
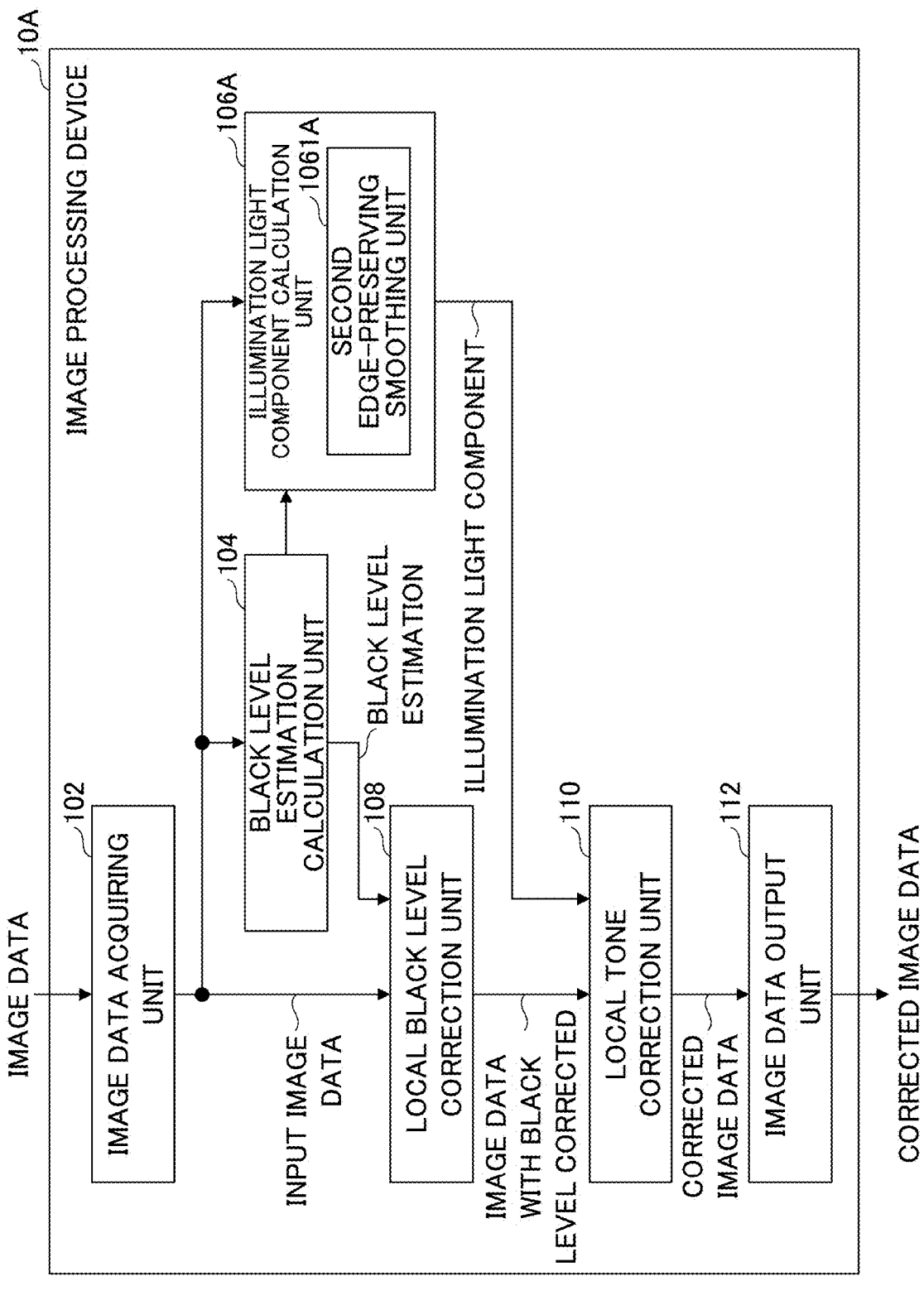
FIG. 13 is a block diagram showing an example of a functional configuration of an image processing device in a second embodiment.

FIG. 13 shows an example of the functional configuration of the image processing device according to the second embodiment. For elements similar to those in the above-described embodiment, the same reference numerals are given, and the detailed description thereof is omitted. The image processing device 10A shown in FIG. 13 is similar to the image processing device 10 shown in FIGS. 1 to 3, and is mounted on the image processing system 100 together with the information processing device 11 and the display device 12. The functions shown in FIG. 13 may be implemented, for example, by the CPU 20 (FIG. 4) of the image processing device 10 shown in FIG. 3 executing an image processing program.

The image processing device 10A has an illumination light component calculation unit 106A instead of the illumination light component calculation unit 106 shown in FIG. 4. The illumination light component calculation unit 106A has a second edge-preserving smoothing unit 1061A. The other configuration of the image processing device 10A is the same as that of the image processing device 10 shown in FIG. 4 except that the black level estimation calculation unit 104 outputs a part of the calculation result to the illumination light component calculation unit 106A.

As shown in FIG. 7, a part of the processing of the second edge-preserving smoothing unit 1061 of the illumination light component calculation unit 106 is the same as the processing of the first edge-preserving smoothing unit 1042 of the black level estimation calculation unit 104 shown in FIG. 5. For example, the square processing, the box filter receiving input image data (guide image data), and the box filter receiving the output of the square processing are common to both the second edge-preserving smoothing unit 1061 and the first edge-preserving smoothing unit 1042.

Therefore, the first edge-preserving smoothing unit 1042 in FIG. 5 outputs, to the second edge-preserving smoothing unit 1061A, the output of the box filter receiving the guide image data Ii, and the output of the box filter receiving the output of the square processing. The second edge-preserving smoothing unit 1061A is configured by removing the functions of the square processing and the two box processing from the second edge-preserving smoothing unit 1061 in FIG. 7.

The second edge-preserving smoothing unit 1061A performs the calculation of the coefficient ak and the calculation of the coefficient bk using the outputs of the two box filters received from the first edge-preserving smoothing unit 1042. That is, the second edge-preserving smoothing unit 1061A utilizes a part of the processing result of the first edge-preserving smoothing process in the second edge-preserving smoothing process.

Thus, the throughput of the second edge-preserving smoothing unit 1061A can be reduced compared with that of the second edge-preserving smoothing unit 1061 shown in FIG. 7. As a result, for example, the processing time of the illumination light component calculation unit 106A can be reduced compared with that of the illumination light component calculation unit 106 shown in FIG. 4, thereby reducing the time required for image processing. In addition, since the load of the image processing unit 10A can be reduced compared with the image processing unit 10, for example, the power consumption of the image processing unit 10A can be reduced.

As described above, the same effect as the above-described embodiment can be obtained in this embodiment. For example, by performing the local black level correction before performing the local tone correction on the image data acquired from the imaging device 19 or the like, raised black levels of the image caused by the local tone correction can be suppressed. That is, even when a large gain is applied to the dark portion of the image in the local tone correction, it is possible to generate an image with high visibility in which the occurrence of raised black levels is suppressed.

Furthermore, in this embodiment, the processing time of the illumination light component calculation unit 106A can be shortened, and thus the time required for image processing can be shortened. In addition, the load of the image processing device 10A can be reduced, and thus the power consumption of the image processing device 10A can be reduced.

Note that in the above-described embodiment, the image processing devices 10 and 10A perform the local black level correction and local tone correction on the entire image captured by the imaging device 19. However, the local black level correction and local tone correction may be applied to a part of the image. For example, the image processing unit 10 may perform the local black level correction and local tone correction only on a limited part of the region around the light source that is prone to halation. At this time, the image processing unit 10 and image processing unit 10A can determine the presence or absence of the light source that is prone to halation, based on whether there is a region at the periphery thereof where the pixel value is larger than a predetermined threshold or not.

Further, in the above-described embodiment, the conditions for performing the local black level correction and local tone correction are not shown. However, for example, the image processing devices 10 and 10A may perform the local black level correction and local tone correction only in an environment susceptible to light sources, such as during the nighttime or at the time of intense backlight. At this time, determination by the image processing devices 10 and 10A of nighttime can be made when the entire image is dark and of backlighting can be made when the entire image is bright or locally bright.

Furthermore, the image processing devices 10 and 10A may estimate the black level by the black level estimation calculation unit 104 based on the luminance calculated from the pixel values of the R pixels, G pixels and B pixels. Also, the image processing devices 10 and 10A may estimate the black level for each pixel value of the R pixels, G pixels and B pixels. In this case, for example, the image processing devices 10 and 10A can reduce colored flares or the like generated around the light sources of each color in the signals in the image.

As above, the present inventive concept has been described based on respective embodiments; note that the present inventive concept is not limited to such specific embodiments, and various modifications and changes can be made within the scope of the gist of the present inventive concept set forth in the claims.

What is claimed is:

1. An image processing device, comprising:
a memory; and
a processor coupled to the memory and configured to
calculate, using image data acquired by an imaging device, a reference black level and a reference illumination light component based on pixel values of peripheral pixels located around a target pixel for image processing;
correct a black level of the target pixel based on the reference black level calculated by the processor; and
perform, based on the reference illumination light component calculated by the processor, a tone correction of the target pixel with the black level thereof corrected,
wherein the processor calculates, for each of a plurality of target pixels, the reference black level and the reference illumination light component based on the pixel values of the peripheral pixels located around the target pixel.

2. The image processing device as claimed in claim 1, wherein the processor calculates a minimum value of the pixel values of the peripheral pixels as the reference black level.

3. The image processing device as claimed in claim 1, wherein the processor calculates an average value of the pixel values of the peripheral pixels as the reference illumination light component.

4. The image processing device as claimed in claim 1, wherein the processor performs a first edge-preserving smoothing process when calculating the reference black level, and performs a second edge-preserving smoothing process when calculating the reference illumination light component.

5. The image processing device as claimed in claim 4, wherein the processor utilizes a part of a processing result of the first edge-preserving smoothing process in the second edge-preserving smoothing process.

6. An image processing method executed by a computer, comprising:
a calculation process of calculating, using image data acquired by an imaging device, a reference black level and a reference illumination light component based on pixel values of peripheral pixels located around a target pixel for image processing;
a black level correction process of correcting a black level of the target pixel based on the reference black level calculated by the calculation process; and
a tone correction process of performing, based on the reference illumination light component calculated by the calculation process, a tone correction of the target pixel with the black level thereof corrected,
wherein, for each of a plurality of target pixels, the reference black level and the reference illumination light component are calculated based on the pixel values of the peripheral pixels located around the target pixel.

7. A non-transitory computer-readable recording medium having a program embodied therein for causing a computer to perform:
a calculation process of calculating, using image data acquired by an imaging device, a reference black level and a reference illumination light component based on pixel values of peripheral pixels located around a target pixel for image processing;
a black level correction process of correcting a black level of the target pixel based on the reference black level calculated by the calculation process; and
a tone correction process of performing, based on the reference illumination light component calculated by the calculation process, a tone correction of the target pixel with the black level thereof corrected,
wherein, for each of a plurality of target pixels, the reference black level and the reference illumination light component are calculated based on the pixel values of the peripheral pixels located around the target pixel.

* * * * *